(12) United States Patent
Estevez et al.

(10) Patent No.: US 11,178,670 B2
(45) Date of Patent: Nov. 16, 2021

(54) METHOD AND APPARATUS FOR DATA COMMUNICATING IN A WIRELESS COMMUNICATION SYSTEM

(71) Applicant: Samsung Electronics Co., Ltd., Gyeonggi-do (KR)

(72) Inventors: David Gutierrez Estevez, Staines (GB); Yinan Qi, Staines (GB); Boon Loong Ng, Plano, TX (US)

(73) Assignee: Samsung Electronics Co., Ltd

( * ) Notice: Subject to any disclaimer, the term of this patent is extended or adjusted under 35 U.S.C. 154(b) by 21 days.

(21) Appl. No.: 16/633,387

(22) PCT Filed: Aug. 7, 2018

(86) PCT No.: PCT/KR2018/008965
§ 371 (c)(1),
(2) Date: Jan. 23, 2020

(87) PCT Pub. No.: WO2019/031816
PCT Pub. Date: Feb. 14, 2019

(65) Prior Publication Data
US 2021/0084655 A1 Mar. 18, 2021

Related U.S. Application Data

(60) Provisional application No. 62/542,040, filed on Aug. 7, 2017.

(30) Foreign Application Priority Data

Aug. 2, 2018 (GB) ...................... 1812581

(51) Int. Cl.
*H04W 72/04* (2009.01)
*H04B 17/336* (2015.01)
(Continued)

(52) U.S. Cl.
CPC ...... *H04W 72/0493* (2013.01); *H04B 7/0408* (2013.01); *H04B 7/0617* (2013.01);
(Continued)

(58) Field of Classification Search
CPC .. H04B 7/0408; H04B 7/0617; H04B 7/0626; H04B 7/0695; H04B 17/345; H04W 24/10; H04W 72/042; H04W 16/28
See application file for complete search history.

(56) References Cited

U.S. PATENT DOCUMENTS 10,455,591 B2 * 10/2019 Wigren ............... H04B 7/0456
2009/0080384 A1 3/2009 Leung
(Continued)

FOREIGN PATENT DOCUMENTS

EP 3 567 760 11/2019
GB 2563412 12/2018
(Continued)

OTHER PUBLICATIONS

PCT/ISA/210 Search Report issued on PCT/KR2018/008965, pp. 3.
(Continued)

*Primary Examiner* — Fahmida S Chowdhury
(74) *Attorney, Agent, or Firm* — The Farrell Law Firm, P.C.

(57) ABSTRACT

A method of controlling communication in a network 1 is provided. The network 1 comprises a first transmission/reception point (TRP) 10A associated with a first user equipment (UE) device 20A and a second TRP 10B associated with a second UE device 20B. The method comprises determining a beam pair link (BPL) 30 between the first TRP 10A and the first UE device 20A and a transmission path therebetween, based at least in part on cross-link interference (CLI) from the transmission between the second TRP 10B and the second UE device 20B.

18 Claims, 4 Drawing Sheets

(51) Int. Cl.
*H04B 7/0408* (2017.01)
*H04B 7/06* (2006.01)
*H04L 5/00* (2006.01)
*H04L 5/14* (2006.01)
*H04L 25/02* (2006.01)
*H04W 24/10* (2009.01)
*H04W 74/08* (2009.01)

(52) U.S. Cl.
CPC ......... *H04B 7/0626* (2013.01); *H04B 7/0695* (2013.01); *H04B 17/336* (2015.01); *H04L 5/0051* (2013.01); *H04L 5/1469* (2013.01); *H04L 25/0226* (2013.01); *H04W 24/10* (2013.01); *H04W 72/042* (2013.01); *H04W 72/046* (2013.01); *H04W 74/0833* (2013.01)

(56) References Cited

U.S. PATENT DOCUMENTS

| | | | |
|---|---|---|---|
| 2018/0048370 A1* | 2/2018 | Cai | H04B 7/0617 |
| 2018/0323916 A1* | 11/2018 | Yang | H04L 5/0053 |
| 2019/0007122 A1* | 1/2019 | Furuskog | H04W 36/0016 |

FOREIGN PATENT DOCUMENTS

| | | |
|---|---|---|
| WO | WO 2014/075532 | 5/2014 |
| WO | WO 2018/128428 | 7/2018 |
| WO | WO 2018/139965 | 8/2018 |
| WO | WO 2018/175674 | 9/2018 |
| WO | WO 2018/228421 | 12/2018 |
| WO | WO 2018/228583 | 12/2018 |

OTHER PUBLICATIONS

PCT/ISA/237 Written Opinion issued on PCT/KR2018/008965, pp. 5.
NTT DOCOMO, INC., "New WID on New Radio Access Technology", 3GPP TSG RAN Meeting #75, RP-170847, Dubrovnik, Croatia, Mar. 6-9, 2017, pp. 8.
ZTE, "Discussion on Measurements and RS Design for CLI Mitigation", 3GPP TSG RAN WG1 Meeting #89, R1-1707204, Hangzhou, P.R. China, May 5, 2017, pp. 11.
Nokia, Alcatel-Lucent Shanghai Bell, "BPL definition and Spatial QCL time indication", 3GPP TSG RAN WG1#89, R1-1708906, Hangzhou, P.R. China, May 6, 2017, pp. 8.
Nokia, Ericsson, ASB, "WF on BPL definition", 3GPP TSG RAN WG1 Meeting #88bis, R1-1706641, Spokane, WA, USA, Apr. 9, 2017, pp. 4.
British Office Action dated Jan. 31, 2019 issued in counterpart application No. 1812581.5, 3 pages.

* cited by examiner

[Fig. 1]
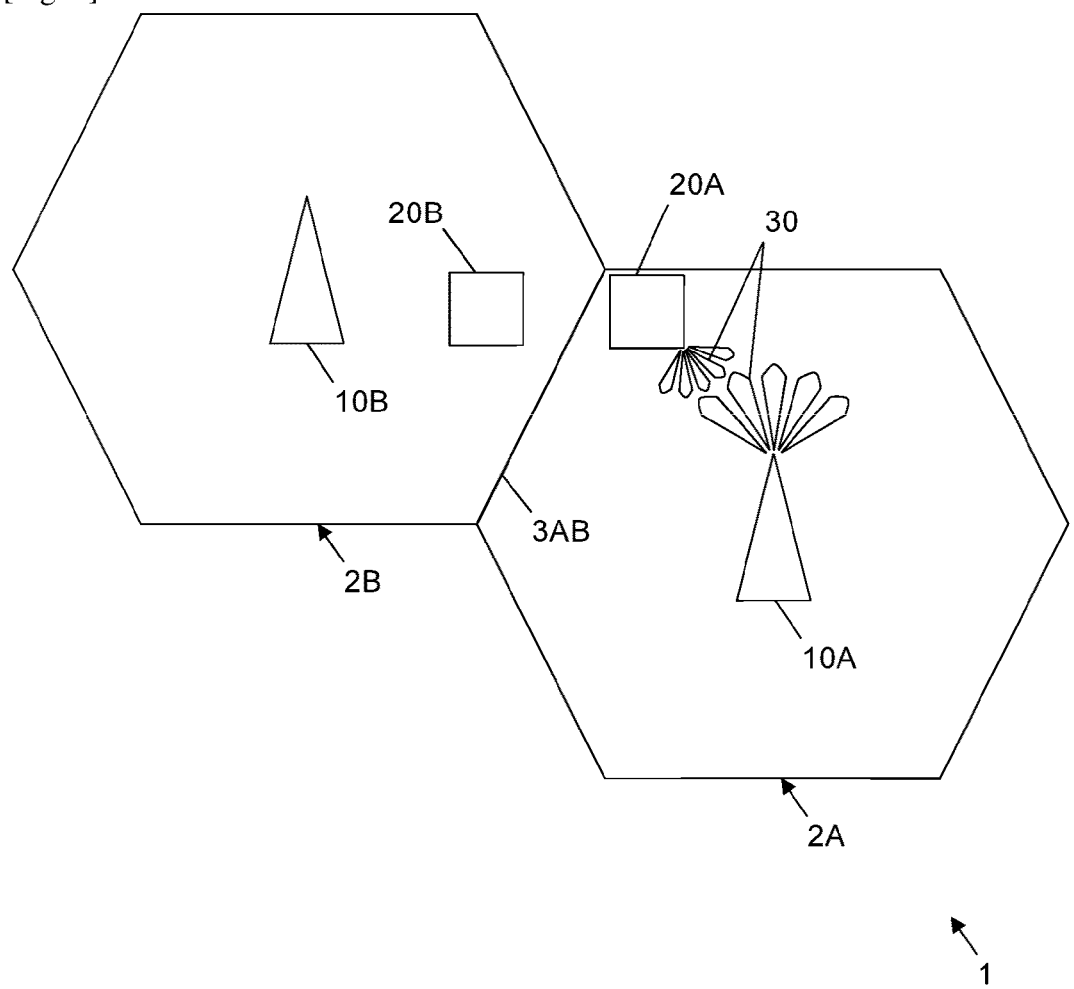
[Fig. 2]
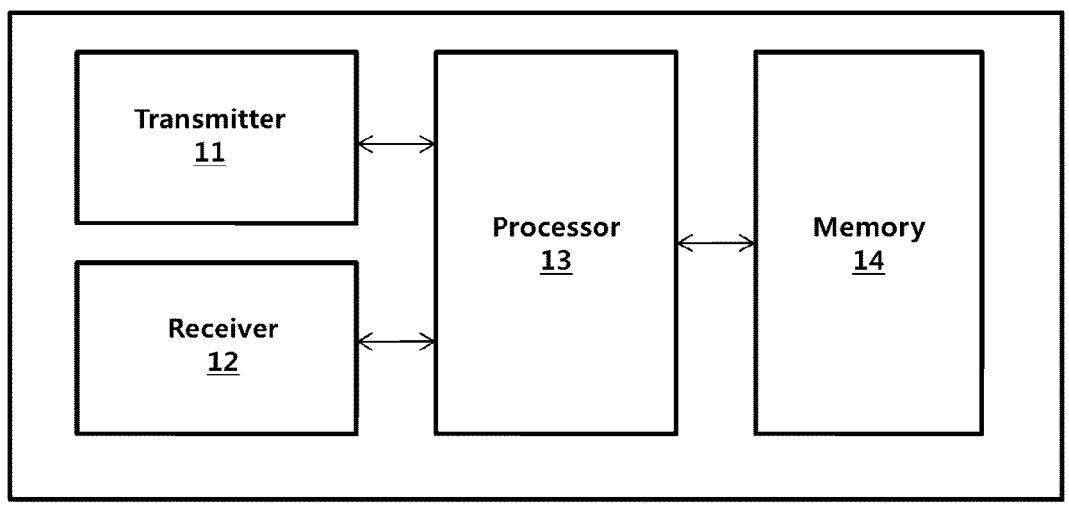

[Fig. 3]
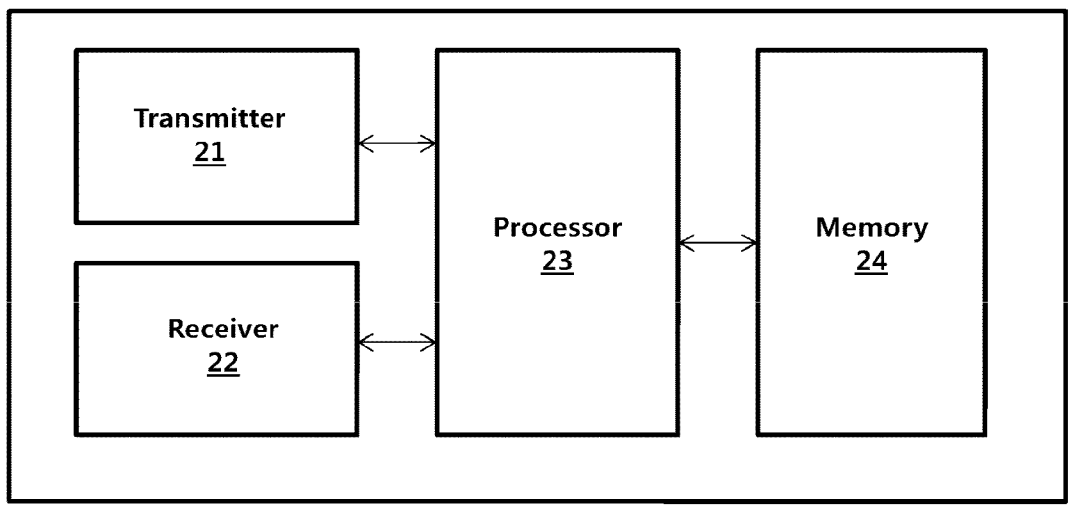
[Fig. 4]
[Fig. 5A]
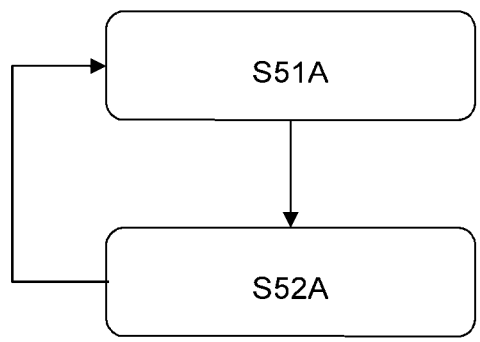
[Fig. 5B]
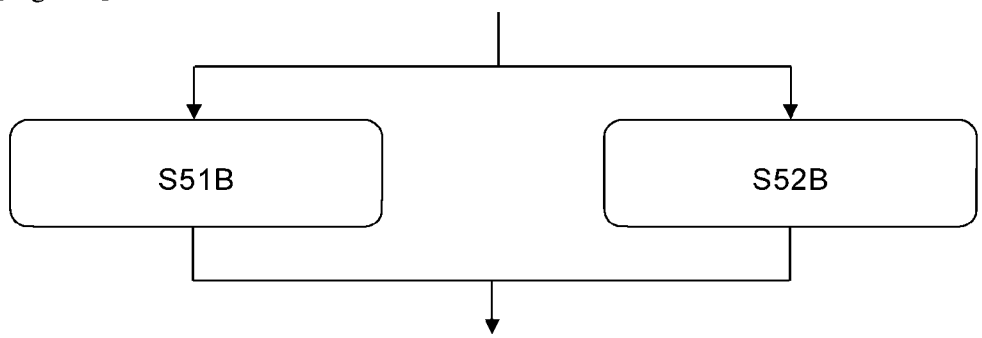

[Fig. 6]
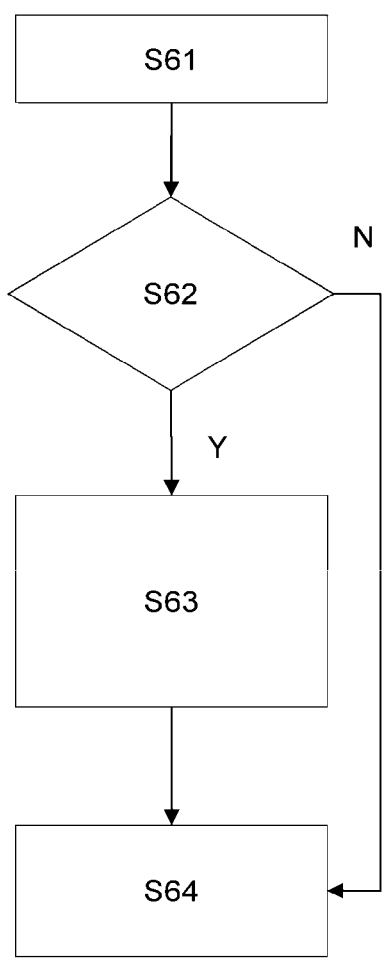

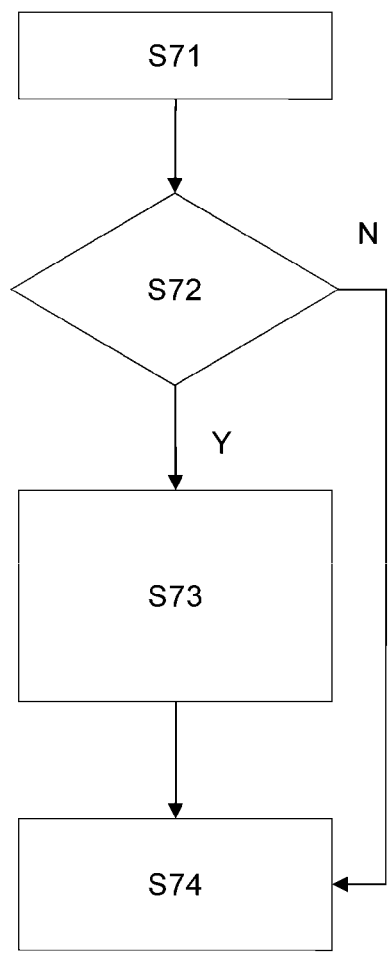
[Fig. 7]

METHOD AND APPARATUS FOR DATA COMMUNICATING IN A WIRELESS COMMUNICATION SYSTEM

PRIORITY

This application is a National Phase Entry of PCT International Application No. PCT/KR2018/008965 which was filed on Aug. 7, 2018, and claims benefit of U.S. Provisional Patent Application No. 62/542,040, which was filed on Aug. 7, 2017, and priority to United Kingdom Patent Application No. 1812581.5, which was filed on Aug. 2, 2018, the content of each of which is incorporated herein by reference.

TECHNICAL FIELD

The present invention relates controlling communication in a network, such as a cellular network. In particular, the present invention relates to controlling transmission between transmission/reception points (TRPs) and user equipment (UE) devices.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long-term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large-scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

In one example, there is provided a method of controlling communication in a network comprising a first transmission/reception point (TRP) associated with a first user equipment (UE) device and a second TRP associated with a second UE device, the method comprising: determining a beam pair link (BPL) between the first TRP and the first UE device and a transmission path therebetween, based at least in part on cross-link interference (CLI) from the transmission between the second TRP and the second UE device.

BRIEF DESCRIPTION OF DRAWINGS

For a better understanding of the invention, and to show how exemplary embodiments of the same may be brought into effect, reference will be made, by way of example only, to the accompanying diagrammatic Figures, in which:

FIG. 1 schematically depicts a system according to an exemplary embodiment;

FIG. 2 schematically depicts a transmission/reception point (TRP) of FIG. 1, in more detail;

FIG. 3 schematically depicts a user equipment (UE) device of FIG. 1, in more detail;

FIG. 4 schematically depicts a method according to an exemplary embodiment;

FIGS. 5A and 5B schematically depict other methods according to exemplary embodiments, in more detail;

FIG. 6 schematically depicts another method according to an exemplary embodiment; and FIG. 7 schematically depicts yet another method according to an exemplary embodiment.

BEST MODE FOR CARRYING OUT THE INVENTION

It is one aim of the present invention, amongst others, to provide a method of controlling communication in a network which at least partially obviates or mitigates at least some of the disadvantages of the prior art, whether identified herein or elsewhere. For example, the present invention may provide a method of controlling communication in a network whereby interference, for example cross-link interference, between transmissions is reduced while supporting increased data transmission rates for an increased number of TRPs and/or UE devices. In this way, a QoS may be maintained and/or improved.

In one example, there is provided a method of controlling communication in a network comprising a first transmission/reception point (TRP) associated with a first user equipment (UE) device and a second TRP associated with a second UE device, the method comprising:

determining a beam pair link (BPL) between the first TRP and the first UE device and a transmission path therebetween, based at least in part on cross-link interference (CLI) from transmission between the second TRP and the second UE device.

In one example, there is provided a system comprising a first transmission/reception point (TRP) associated with a first user equipment (UE) device, wherein the system is arranged to:

determine a beam pair link (BPL) between the first TRP and the first UE device and a transmission path therebetween, based at least in part on cross-link interference (CLI) from transmission between a second TRP and a second UE device.

In one example, there is provided a first transmission/reception point (TRP) arranged to communicate with a first user equipment (UE) device, wherein the first TRP is further arranged to determine, at least in part, a beam pair link (BPL) between the first TRP and the first UE device and a transmission path therebetween, based at least in part on cross-link interference (CLI) from transmission between a second TRP associated with a second UE device.

In one example, there is provided a first user equipment (UE) device arranged to communicate with a first transmission/reception point (TRP), wherein the first UE device is further arranged to determine, at least in part, a beam pair link (BPL) between the first TRP and the first UE device and a transmission path therebetween, based at least in part on cross-link interference (CLI) from transmission between a second TRP associated with a second UE device.

In one example, there is provided a tangible non-transient computer-readable storage medium is provided having recorded thereon instructions which, when implemented by a transmission/reception point (TRP) and/or a user equipment (UE) device, cause the TRP and/or the UE device to be arranged as set forth herein and/or which cause the TRP and/or the UE device to perform any of the methods as set forth herein.

In one example, the method comprises configuring the first UE device and/or the second UE device according to the determined TDD configuration.

In one example, the TDD configuration is a UE-specific TDD configuration.

In one example, the TDD configuration is a UE-nonspecific TDD configuration.

In one example, determining is responsive to the first UE device changing state from an idle state to an active state in a cell.

In one example, the determining is responsive to the first UE device losing connection with the first TRP because of movement, rotation and/or blocking of the first UE device.

In one example, the sequentially determining the BPL between the first TRP and the first UE device and determining the transmission path therebetween comprises iteratively sequentially determining the BPL between the first TRP and the first UE device and determining the transmission path therebetween.

In one example, the determining the BPL between the first TRP and the first UE device and the transmission path therebetween comprises simultaneously determining the BPL between the first TRP and the first UE device and determining the transmission path therebetween.

In one example, the method comprises reporting measurements of the measuring the CLI.

In one example, the muting the resource comprises signalling to mute the resource.

In one example, the method comprises configuring a timer to reactivate the muted resource.

In one example, the method comprises reactivating the muted resource using radio resource control (RRC), message authentication code control element (MAC CE) and/or dynamic control information (DCI) signalling.

In one example, the controlling the first UE device and/or the second UE device to control the UL transmission power of the reference signal is implemented via MAC CE signalling and/or DCI signalling.

In one example, the method comprising establishing a correspondence between a CLI measurement reference signal and a beam management reference signal of the first TRP.

In one example, there is provided a tangible non-transient computer-readable storage medium is provided having recorded thereon instructions which when implemented by a first transmission/reception point (TRP) and/or a first user equipment (UE) device, cause the first TRP and/or the first UE device to perform a method of controlling communication in a network comprising the first TRP associated with the first UE device and a second TRP associated with a second UE device.

MODE FOR THE INVENTION

According to the present invention there is provided a method of as set forth in the appended claims. Also provided is a transmission/reception point (TRP), a user equipment (UE) device, a system comprising a TRP and a UE device, and a computer-readable storage medium. Other features of the invention will be apparent from the dependent claims, and the description that follows.

Throughout this specification, the term "comprising" or "comprises" means including the component(s), unit(s), module(s), feature(s) or integer(s) specified but not to the exclusion of the presence of other components, units, modules, features or integers.

The term "consisting of" or "consists of" means including the component(s), unit(s), module(s), feature(s) or integer(s) specified but excluding other components, units, modules, features or integers.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

Data transmission rates in cellular networks (also known as mobile networks) may be increased by transmitting at higher frequency ranges, for example at carrier frequencies in bands at 6 GHz or higher, such as supported by New Radio (NR). However, as the carrier frequencies are increased, free space path losses increase. In addition, transmission may be affected by non-line-of-sight (non-LOS) losses, for example, due to diffraction losses, penetration losses, oxygen absorption losses and/or foliage losses.

To mitigate for these losses, beamformed transmission may be required, in which transmission between transmission/reception points (TRPs) and user equipment (UE) devices is directional. This directional transmission contrasts, for example, with omni-directional transmission in conventional Long Term Evolution (LTE) that transmits at lower carrier frequencies. Beam management (BM) is required to determine this directional transmission between the TRP and the UE devices. To increase spectrum flexibility due to different UL and DL data transmission rates, for example, time division duplexing (TDD) may be provided for the directional transmission. Generally, directional transmission between a TRP and a UE device may be defined by a beam pair link including one transmitter (Tx) beam and one receiver (Rx) beam in one link direction, for example uplink (UL) or downlink (DL). However, due to movement, rotation and/or blocking of the UE devices, redetermination of the directional transmission may be required to maintain Quality of Service (QoS), thereby increasing beam management overhead.

In addition, the numbers of TRPs and UE devices are increasing monotonically, thereby further increasing network management overhead.

Hence, there is a need to improve control of communication in networks, for example cellular networks, so as to support increased data transmission rates while supporting also an increased number of TRPs and/or UE devices.

In one example, there is provided the method of controlling communication in a network comprising a first transmission/reception point (TRP) associated with a first user equipment (UE) device and a second TRP associated with a second UE device, the method comprising:

determining a beam pair link (BPL) between the first TRP and the first UE device and a transmission path therebetween, based at least in part on cross-link interference (CLI) from transmission between the second TRP and the second UE device.

In this way, by determining, for example jointly determining, the BPL between the first TRP and the first UE device and transmission path, for example downlink (DL) or uplink (UL), therebetween, based at least in part on the CLI with the transmission between the second TRP and the second UE device, increased data transmission rates for an increased number of TRPs and/or UE devices may be provided while maintaining and/or improving QoS.

It should be understood that the first TRP and the second TRP may be similar, for example, interchangeable. Hence, references herein to the first TRP, the second TRP and/or another TRP, for example a TRP, may interchanged. It should be understood that the first UE device and the second UE device may be similar, for example, inter-changeable. Hence, references herein to the first UE device, the second UE device and/or another UE device, for example a UE device, may be interchanged.

Generally, beam management may be used to select BPLs between TRPs and UE devices. Beam management may be categorized based on transmission direction: DL beam management and UL beam management.

For DL beam management, three procedures may be defined:

1. P-1 is used to enable UE device measurement on different TRP Tx beams to support selection of TRP Tx beams/UE device Rx beam(s);

2. P-2 is used to enable UE device measurement on different TRP Tx beams to possibly change inter/intra-TRP Tx beam(s); and 3. P-3 is used to enable UE device measurement on the same TRP Tx beam to change UE device Rx beam in the case that the UE device uses beamforming.

UL beam management may be used to select an UL BPL at the TRP and/or the UE device. If beam correspondence holds at both the TRP and the UE device, TRP Tx and UE device Rx beam information obtained in DL beam management may be utilized for UL transmission and UL beam management can be omitted. Otherwise, UL beam management may be required to find UL beams. For UL beam management, three procedures (U-1, U-2 and U-3) may be defined. U-1 is a basic procedure used to select both TRP Rx beam and UE device Tx beam. U-2 and U-3 may be used for refinement of beams selected in U-1. For the cases of U-1 and U-3, the TRP may measure different UE device Tx beams and select the UE device Tx beams. Therefore, in these cases, the TRP should indicate the information of the selected Tx beams to the UE device. The TRP may inform beam-related indication associated with a plurality N UE device Tx beams.

Time Division Duplex (TDD) separates DL transmission from UL transmission by allocation of different time slots, respectively, in a same frequency band. TDD allows asymmetric DL and UL transmission over the same BPL. Flexible TDD allows modification of the asymmetry of the DL and UL transmission so as to increase spectrum flexibility.

However, directional transmission according to the BPL coupled with TDD may result in cross-link interference (CLI), for example, due to simultaneous DL and UL transmission, respectively, on two different BPLs. For example, CLI may thus have the form of TRP-to-TRP interference from downlink transmission for DL UE devices to uplink reception for UL UE devices in different cells. Further, probable LoS between the TRPs and the relatively high directional transmission power may cause significant degrading interference. In addition, proximal UE devices may be subject to CLI since interference from uplink transmission of UL UE devices may adversely affect downlink reception of DL UE devices in different cells. Furthermore, movement, rotation and/or blocking of the UE devices, for example, may exacerbate CLI and/or make UE-UE device interference more problematic compared with TRP-to-TRP interference.

The inventors have identified that by jointly determining the BPL between the first TRP and the first UE device and transmission path, for example downlink (DL) or uplink (UL), therebetween, based at least in part on the CLI with the transmission between the second TRP and the second UE device, interference may be reduced, interference management may be facilitated, beam management signalling overhead may be reduced, and/or beam management may be accelerated. In this way, increased data transmission rates for an increased number of TRPs and/or UE devices may be provided while maintaining and/or improving QoS. While candidate BPLs could be less favourable due to relatively higher CLIs, thereby potentially reducing flexibility, flexible TDD may permit reversing transmission directions (i.e. from DL to UL or vice versa) of the candidate BPLs and/or of interfering BPLs so as to reduce the CLIs for those candidate BPLs and hence restore flexibility.

The method is applicable both to UL and DL, integrating interference considerations when jointly performing beam management and determining transmission paths, for example setting dynamic TDD configurations, in a network. For example, the method may determine the BPL, including TRP and UE device Tx/Rx beams, and transmission paths (UL and/or DL) for each UE device.

Generally, in Universal Mobile Telecommunications System (UMTS) and 3GPP Long Term Evolution (LTE), UE devices allow users to access network services. In other words, a UE device is any device used by a user to communicate on a network. The UE device may be, for example, a device comprising a transmitter and a receiver or a transceiver, such as a mobile telephone or a laptop computer equipped with a mobile broadband adapter. The user may be a human user or a non-human user, for example a vehicle or infrastructure. The UE device may connect to or communicate with or via an access point (AP) for example an Universal Terrestrial Radio Access Network (UTRAN) access point such as a base station Node B (Node B or NB) and/or an evolved base station Node B (eNodeB or eNB and/or a gNodeB (gNB). That is, the UE device may transmit data to and/or receive data from the access point, as described below. Furthermore, the device may connect to or communicate with or via another such UE device.

The TRP comprises and/or is an access point, for example a UTRAN access point. It should be understood that an UTRAN access point may be a conceptual point within the UTRAN performing radio transmission and reception. The UTRAN access point may be associated with one specific cell. That is, there may exist one UTRAN access point, for example a TRP, for each cell. The UTRAN access point may be the UTRAN-side end point of a radio link. In other words, the TRP may define a cell.

It should be understood that a cell may be a radio network object that may be uniquely identified by the UE device from a cell identification that is broadcast over a geographical area from one UTRAN access point. A cell may be in either Frequency Division Duplex (FDD) or Time Division Duplex (TDD) mode.

It should be understood that a sector may be a sub-area of a cell. All sectors within the cell may be served by the same access point. A radio link within the sector may be identified by a single logical identification belonging to the sector.

Integrating interference considerations into beam management may be advantageous, as described below.

For example, beams causing significant interference may be identified from TRP-to-TRP and/or UE-to-UE interference measurement reports, for example from previous CLI management. By identifying these 'harmful' beams, beam management may be facilitated. Furthermore, reference signal (RS) configuration and/or reporting requirements may be reduced and/or avoided, thereby reducing beam management overhead.

Additionally and/or alternatively, dynamic TDD may provide an additional degree of freedom by enabling a transmission path in an interfered cell to be reversed, allowing a preferred but conventionally interfering candidate BPL to be selected. For example, in DL, a first stage of beam management using a synchronisation signal (SS) block may require a plurality of candidate BPLs and hence beams because the preferred, highest power beam may cause undesirable interference in the interfered cell. In such a case, a less preferred, lower power beam may be selected for a second stage of beam management. However, dynamic TDD may reverse the transmission path in the conventionally-interfered cell, thereby resolving the interference and allowing selection of the preferred highest power beam BPL.

In addition, the CLI management procedure may need to be able to activate BM procedure due to strong beamformed interference. For example, when the first UE device associated with the first TRP select BPL M, it may generate strong interference to the second UE device associated with the second TRP. If this interference cannot be mitigated by dynamic TDD configuration, the CLI management procedure may need to activate the beam management of the first UE device to choose a different BPL with reduced interference to the second UE device.

The method may be applied to at least the following scenarios:

1. When a new UE device arrives in a cell or an idle UE device becomes active in the cell or a UE device loses its current connection because of movement, rotation and/or blocking, a BPL and a duplexing configuration may be determined based on predetermined interference criteria for such a UE device;

2. When a new UE device arrives in the cell or an idle UE device becomes active in the cell or a UE device loses its current connection because of movement, rotation and/or blocking, BPL and duplexing configurations may be determined based on predetermined interference criteria for such a UE device, and for other UE devices in the cell associated with the same TRP;

3. When a new UE device arrives in the cell or an idle UE device becomes active in the cell or a UE device loses its current connection because of movement, rotation and/or blocking, BPL and duplexing configurations may be determined based on predetermined interference criteria for such a UE device, respectively, and for other UE devices associated with other TRPs, for example coordinating TRPs and/or TRPs in other cells, for example adjacent, neighbouring and/or proximal cells.

In one example, the first TRP and the second TRP respectively provide adjacent cells.

In one example, the determining the transmission path comprises determining a time division duplex (TDD) configuration for the first UE device and/or the second UE device. It should be noted that the TDD configuration may not be UE-specific and therefore may not always be feasible for each individual UE device. However, the CLI interference pattern of each UE device will be accumulated and contribute to the final TDD configuration decision.

In one example, the method comprises configuring the first UE device and/or the second UE device according to the determined TDD configuration. In one example, the TDD configuration is a UE-specific TDD configuration. In one example, the TDD configuration is a UE-nonspecific TDD configuration.

In one example, the determining is based at least in part on CLI from transmission between the first TRP and another UE device associated with the first TRP. In one example, the determining is based at least in part on CLI due to transmission between the first TRP and the first UE device.

When a new UE device arrives or an idle UE device becomes active or a UE device loses its current connection because of movement, rotation and/or blocking, for example, such UE device, respectively, may be subject to interference from other UE devices, for example other UE devices, associated with the same TRP (i.e. in the same cell) or other UE devices associated with TRPs in other cells, for example adjacent, neighbouring and/or proximal cells. This interference may be termed r-interference. Additionally and/or alternatively, such a UE device may generate interference, for example a specific interference pattern, for other UE devices associated with other TRPs in other cells, for example adjacent, neighbouring and/or proximal cells. This interference may be termed as g-interference, depending on a configuration of the BPL and the TDD.

Both r-interference and g-interference may be relevant for the three scenarios described above. However, to improve management overhead for example, the first and second scenarios may consider only r-interference. For the third scenario, both r-interference and g-interference should be considered.

In one example, the determining is responsive to the first UE device entering a first cell, for example from another cell due to movement of the first UE device from the another cell to the first cell. The first cell may be defined by the first TRP.

In one example, the determining is responsive to the first UE device changing state from an idle state to an active state in a first cell.

In one example, the determining is responsive to the first UE device losing connection with the first TRP because of movement, rotation and/or blocking of the first UE device.

In one example, CLI measurement and/or reporting are based, at least in part, on Reference Signal Received Power (RSRP) and/or Received Signal Strength Indicator (RSSI). In one example, BPL selection is based, at least in part, on RSRP and/or channel state information (CSI).

In one example, the determining the BPL between the first TRP and the first UE device and the transmission path therebetween comprises sequentially and/or successively determining the BPL between the first TRP and the first UE device and determining the transmission path therebetween. For example, the BPL may be determined and the transmission path may be determined subsequently or vice versa. In one example, the determining the BPL between the first TRP and the first UE device and the transmission path therebetween comprises simultaneously determining the BPL between the first TRP and the first UE device and determining the transmission path therebetween. In one example, the determining the BPL between the first TRP and the first UE device and the transmission path therebetween comprises iteratively determining the BPL between the first TRP and the first UE device and determining the transmission path therebetween. In one example, the determining the BPL between the first TRP and the first UE device and the transmission path therebetween comprises sequentially-iteratively and/or successively-iteratively determining the BPL between the first TRP and the first UE device and determining the transmission path therebetween. For example, the BPL may be determined, the transmission path may be determined subsequently and these determinations may be repeated one or more times.

In other words, the method may be implemented as a sequential-iterative method or as a simultaneous method. The sequential-iterative method may, for example, perform in the first place the beam management-related decisions, and only afterwards would duplexing configuration be decided, choosing to alternate the TDD configuration of neighbouring cells in case beamformed interference is degrading. This decision may be modified over time in a iterative manner, as TDD decisions are fed back to the beam management to redetermine the beams. In contrast, for the simultaneous method, the method simultaneously outputs a beam alignment decision and a duplexing configuration for the first TRP and the first UE device. It should be noted that the TDD configuration may not be UE-specific and therefore may not always feasible for each individual UE device.

However, the CLI interference pattern of each UE device will be accumulated and contribute to the final TDD configuration decision.

In one example, the method comprises measuring, for example by the second UE device, interference, for example CLI generated by the first UE device. Interference, for example CLI, generated by the first UE device may affect the transmission by the second TRP and/or the second UE device. In one example, the method comprises reporting or forwarding, for example by the second UE device, results or measurements of the measuring of the interference, for example to the TRP. The TRP may forward these results to the network (NW), for example to a gNB. In one example, the method comprises determining, by a NW, interference criteria, for example, threshold and/or acceptable interference criteria. Additionally and/or alternatively, the interference criteria may be predetermined.

Generally, a gNB may configure one or more groups of SRS resources adaptively, for example for different purposes such as beam management and/or DL CSI acquisition. In one example, a SRS resource group is provided for UE-to-UE interference measurement. This SRS group may be denoted as a U-SRS group. If an interfering and/or deleterious Tx SRS beam (i.e. a harmful beam) is identified by from the UE-to-UE interference measurement results, corresponding SRS transmission beams in the UL beam management SRS resource group, denoted as a B-SRS group, may be identified. In contrast, quasi co-location (QCL) with respect to spatial parameters between two groups might not be appropriate and/or valid since the spatial parameters are more concerned with reception and the receiver types are different, i.e. affected or victim UE device for the U-SRS group and the gNB of the aggressor UE device for the B-SRS group, respectively. In this regard, the B-SRS group and U-SRS group should be the same or the B-SRS group should be a subset of U-SRS group. In one example, the method comprises establishing a correspondence between a CLI measurement reference signal and a beam management reference signal of the first UE device.

In one example, the method comprises establishing a correspondence between a CLI measurement reference signal and a beam management reference signal of the first TRP.

Taking the UL beam management as an example, the 'harmful' beams of the aggressor UE device can be identified but the NW in the UE-to-UE measurement and reporting, which is part of CLI management. When the aggressor UE device needs to do Tx beam sweep in UL beam management, such information can be explored. The SRS Tx beams which correspond to the 'harmful' beams can be muted in the beam sweep so that less SRS resources need to be configured, leading to less signalling overhead and fast beam sweep. The reason to mute these SRS Tx beams is because they will generate significant CLI interference according to the CLI measurement and reporting. By doing this, we link the CLI management with beam management and CLI management.

In one example, the method comprises modifying a muting decision. For example, the SRS muting decision may be overwritten by the NW.

In one example, the method comprises muting a resource and/or a plurality of resources. In this context, muting the resource and/or the plurality of resources means switching off a particular SRS transmission beam and/or particular SRS transmission beams, respectively.

In one example, wherein the method comprises muting a sounding reference signal (SRS) resource or a physical random-access channel (PRACH) resource for uplink (UL) and synchronization signal (SS) resource or beam management channel state information-reference signal (CSI-RS) resource for downlink (DL).

In one example, the muting the resource comprises signalling to mute the resource.

In one example, signalling to mute a resource and/or a plurality of resources, for example a certain SRS resource and/or a certain PRACH resource, is based on MAC Control Element (MAC CE) signalling. A benefit of MAC CE signalling is that signalling latency may be shorter than that for RRC signalling. In addition, MAC CE signalling may be more adaptive than RRC signalling to the need for dynamic CLI mitigation.

In one example, the MAC CE signalling indicates one or more resources, for example SRS resources and/or PRACH resources, that should be muted by the UE device. A duration of muting may be indicated by the network. After expiry of the duration, the UE device may assume that the resources, for example the SRS resources and/or the PRACH resources, are no longer muted. The duration of muting may be indicated by RRC. Additionally and/or alternatively, the duration of muting may be indicated in the MAC CE signalling indicating the resource muting. Additionally, and/or alternatively, the duration of muting may be indicated in a separate MAC CE signalling.

In one example, the resources, for example SRS resources and/or PRACH resources, indicated to be muted are assumed by the UE device to remain muted until reception of a subsequent signal.

In one example, MAC CE signalling is configurable, for example optionally configured. If the signalling is not configured, the UE device may assume that some and/or all resources configured by RRC are not muted.

In one example, signalling to mute a resource and/or a plurality of resources, for example a certain SRS resource and/or a certain PRACH resource, is based on dynamic control information (DCI) signalling, carried on a physical downlink control channel (PDCCH). A benefit of DCI signalling is that signalling latency may be shorter than for MAC CE signalling. In addition, MAC signalling may be adaptive, for example, for dynamic CLI mitigation on a slot basis. The DCI signalling may be implemented similarly to MAC CE signalling, as described previously. The DCI signalling may also be applied to enable on-demand or one-time 'aperiodic' muting, for example, in which muting is applied, for example only applied, to the resource in the same slot or the first slot configured with the resource after decoding of the signalling.

In one example, the method comprises configuring a timer to reactivate the muted resource.

In one example, the method comprises reactivating the muted resource using radio resource control (RRC), message authentication code control element (MAC CE) and/or dynamic control information (DCI) signalling.

In one example, the method comprises controlling the first UE device and/or the second UE device to control UL transmission power, for example by reducing the UL transmission power and/or limiting the UL transmission power to a predetermined or a dynamic limit. Controlling the UL transmission power may be with respect to a resource, for example a certain SRS resource or certain PRACH resource. In this way, instead of muting a certain transmission direction to mitigate CLI, the UE device may be indicated to reduce the UL transmit power for a certain SRS resource or PRACH resource. Additionally and/or alternatively, the UE device may be configured to cap its UL transmit power to a smaller maximum for a certain SRS resource or PRACH resource. In one example, controlling the first UE device and/or the second UE device to control UL transmission power is implemented via MAC CE signalling and/or DCI signalling. That is, the signalling methods described previously may be applied for the UL transmit power control for a certain SRS resource or PRACH resource, for example.

In one example, the method comprises beam management, for example UL and/or DL beam management, without RRC configuration. In one example, the method comprises loading resources, for example SRS and/or PRACH resources, from a pool, for example, from a RRC configured pool. In one example, the method comprises detecting beams, for example harmful beams. In one example, the method comprises removing one or more detected beams from the pool, for example one or more harmful beams from the RRC configured pool. In one example, the method comprises releasing resources corresponding with the removed beams, for example releasing the SRS and/or PRACH resources corresponding with the removed harmful beams. In one example, the method comprises beam sweeping using the beams in the pool i.e. the beams remaining in the pool after the removing one or more detected beams from the pool.

In one example, the method comprises beam management, for example UL and/or DL beam management, with RRC configuration. In one example, the method comprises loading resources, for example SRS and/or PRACH resources, from a pool, for example, from a RRC configured pool. In one example, the method comprises receiving a RRC reconfiguration (i.e. signalled beams). In one example, the method comprises removing one or more signalled beams from the pool according to the received RRC reconfiguration, for example one or more harmful beams from the RRC configured pool. In one example, the method comprises releasing resources corresponding with the removed beams, for example releasing the SRS and/or PRACH resources corresponding with the removed harmful beams. In one example, the method comprises beam seeping using the beams in the pool i.e. the beams remaining in the pool after the removing one or more signalled beams from the pool.

In one example, the first UE device is amongst a plurality of first UE devices and the method comprises determining the BPL between the first TRP and the first UE device and the transmission path therebetween for the plurality of first UE devices. For example, the method may comprise determining respective BPLs between the first TRP and each of the plurality of first UE devices, and respective transmission paths therebetween.

In one example, the first UE device is amongst a plurality of first UE devices and the first TRP is amongst a plurality of TRPs and the method comprises determining the BPL between the first TRP and the first UE device amongst the plurality of first UE devices and the transmission path therebetween for the plurality of first UE devices and/or the plurality of first TRPs. For example, the method may comprise determining respective BPLs between the first TRP amongst the plurality of first TRPs and the first UE device amongst the plurality of first UE devices and the transmission path therebetween and determining respective BPLs and respective transmission paths for the plurality of first TRPs and/or the plurality of first UE devices.

In one example, there is provided a user equipment (UE) device arranged to communicate with a transmission/reception point (TRP), wherein the UE device is further arranged to determine, at least in part, a beam pair link (BPL) between the TRP and the UE device and a transmission path therebetween, based at least in part on cross-link interference (CLI) from transmission between a second TRP associated with a second UE device.

The UE device and/or the TRP may be as described herein. Particularly, the UE device and/or the TRP may be arranged to perform any of the methods as set forth herein.

In one example, there is provided a transmission/reception point (TRP) arranged to communicate with a user equipment (UE) device, wherein the TRP is further arranged to determine, at least in part, a beam pair link (BPL) between the TRP and the UE device and a transmission path therebetween, based at least in part on cross-link interference (CLI) from transmission between a second TRP associated with a second UE device.

The UE device and/or the TRP may be as described herein. Particularly, the UE device and/or the TRP may be arranged to perform any of the methods as set forth herein.

In one example, there is provided a system comprising a first transmission/reception point (TRP) associated with a first user equipment (UE) device, wherein the system is arranged to: determine a beam pair link (BPL) between the first TRP and the first UE device and a transmission path therebetween, based at least in part on cross-link interference (CLI) from transmission between a second TRP and a second UE device.

The UE device and/or the TRP may be as described herein. Particularly, the UE device and/or the TRP may be arranged to perform any of the methods as set forth herein.

In one example, there is provided a tangible non-transient computer-readable storage medium is provided having recorded thereon instructions which, when implemented by a transmission/reception point (TRP) and/or a user equipment (UE) device, cause the TRP and/or the UE device to be arranged as set forth herein and/or which cause the TRP and/or the UE device to perform any of the methods as set forth herein.

FIG. 1 schematically depicts a system 1 according to an exemplary embodiment. The system 1 comprises a first transmission/reception point (TRP) 10A associated with a first user equipment (UE) device 20A. The system 1 is arranged to determine a beam pair link (BPL) 30 between the first TRP 10A and the first UE device 20A and a transmission path therebetween, based at least in part on cross-link interference (CLI) from transmission between a second TRP 10B and a second UE device 20B.

In this way, by jointly determining the BPL 30 between the first TRP 10A and the first UE device 20A and transmission path, for example downlink (DL) or uplink (UL), therebetween, based at least in part on the CLI with the transmission between the second TRP 10B and the second UE device 20B, increased data transmission rates for an increased number of TRPs 10 and/or UE devices 20 may be provided while maintaining and/or improving QoS.

In more detail, the first TRP 10A defines a first cell 2A. The second TRP 10B similarly defines a second cell 2B. The first cell 2A and the second cell 2B are adjacent, having a boundary 3AB.

The transmission between the second TRP 10B and the second UE device 20B results in the CLI with a transmission between the first TRP 10A and the first UE device 20B. The BPL 30 between the first TRP 10A and the first UE device 20A and the transmission path therebetween are determined based at least in part on cross-link interference CLI.

FIG. 2 schematically depicts a transmission/reception point (TRP) 10 of FIG. 1, in more detail.

Particularly, the TRP 10, for example the first TRP 10A and/or the second TRP 10B, is arranged to communicate with a user equipment (UE) device 20, for example the first UE device 20A and/or the second user device 20B. The TRP 10 is further arranged to determine, at least in part, a beam pair link (BPL) between the TRP 10 and the UE device 20 and a transmission path therebetween, based at least in part on cross-link interference (CLI) from transmission between a second TRP 10 associated with a second UE device 20.

In more detail, the TRP 10 comprises a transmitter 11, a receiver 12, a processor 13 and memory 14. However, all of the illustrated components are not essential. The UE device 20 may be implemented by more or less components than those illustrated in FIG. 2. In addition, the processor 13, the transceiver 11, the receiver 12 and the memory 14 may be implemented as a single chip according to another embodiment.

The TRP 10 comprises the processor 13, arranged to determine at least in part, the beam pair link (BPL) between the TRP 10 and the UE device 20 and the transmission path therebetween, based at least in part on cross-link interference (CLI) from transmission between a second TRP 10 associated with a second UE device 20.

The processor 13 may include one or more processors or other processing devices that control the proposed function, process, and/or method. Operation of the TRP 10 may be implemented by the processor 13.

A transceiver may include the transmitter 11 and the receiver 12.

The transceiver may include a RF transmitter for up-converting and amplifying a transmitted signal, and a RF receiver for down-converting a frequency of a received signal. However, according to another embodiment, the transceiver may be implemented by more or less components than those illustrated in components.

The transceiver may be connected to the processor 13 and transmit and/or receive a signal. The signal may include control information and data. In addition, the transceiver may receive the signal through a wireless channel and output the signal to the processor 13. The transceiver may transmit a signal output from the processor 13 through the wireless channel.

The memory 14 may store the control information or the data included in a signal obtained by the TRP 10. The memory 14 may be connected to the processor 13 and store at least one instruction or a protocol or a parameter for the proposed function, process, and/or method. The memory 14 may include read-only memory (ROM) and/or random access memory (RAM) and/or hard disk and/or CD-ROM and/or DVD and/or other storage devices.

FIG. 3 schematically depicts a user equipment (UE) device 20 of FIG. 1, in more detail.

Particularly, the UE device 20, for example the first UE device 20A and/or the second user device 20B, is arranged to communicate with a TRP 10, for example the first TRP 10A and/or the second TRP 10B. The UE device 20 is further arranged to determine, at least in part, a beam pair link (BPL) between the TRP 10 and the UE device 20 and a transmission path therebetween, based at least in part on cross-link interference (CLI) from transmission between a second TRP 10 associated with a second UE device 20.

In more detail, the UE device 20 comprises a transmitter 21, a receiver 22, a processor 23 and memory 24. However, all of the illustrated components are not essential. The UE device 20 may be implemented by more or less components than those illustrated in FIG. 3. In addition, the processor 23, the transceiver 21, the receiver 22 and the memory 24 may be implemented as a single chip according to another embodiment.

The UE device 20 comprises the processor 23, arranged to determine at least in part, the beam pair link (BPL) between the TRP 10 and the UE device 20 and the transmission path therebetween, based at least in part on cross-link interference (CLI) from transmission between a second TRP 10 associated with a second UE device 20.

The processor 23 may include one or more processors or other processing devices that control the proposed function, process, and/or method. Operation of the UE device 20 may be implemented by the processor 23.

A transceiver may include the transmitter 21 and the receiver 22.

The transceiver may include a RF transmitter for up-converting and amplifying a transmitted signal, and a RF receiver for down-converting a frequency of a received signal. However, according to another embodiment, the transceiver may be implemented by more or less components than those illustrated in components.

The transceiver may be connected to the processor 23 and transmit and/or receive a signal. The signal may include control information and data. In addition, the transceiver may receive the signal through a wireless channel and output the signal to the processor 23. The transceiver may transmit a signal output from the processor 23 through the wireless channel.

The memory 24 may store the control information or the data included in a signal obtained by the UE device 20. The memory 24 may be connected to the processor 23 and store at least one instruction or a protocol or a parameter for the proposed function, process, and/or method. The memory 24 may include read-only memory (ROM) and/or random access memory (RAM) and/or hard disk and/or CD-ROM and/or DVD and/or other storage devices.

FIG. 4 schematically depicts a method of controlling communication in a network comprising a first transmission/reception point (TRP) associated with a first user equipment (UE) device and a second TRP associated with a second UE device according to an exemplary embodiment.

At S41, a beam pair link (BPL) between the first TRP and the first UE device and a transmission path therebetween are determined, based at least in part on cross-link interference (CLI) from the transmission between the second TRP and the second UE device.

The method may include any of the steps described previously.

For example, the method may be applied to at least the following scenarios, as described previously:

1. When a new UE device arrives in a cell or an idle UE device becomes active in the cell or a UE device loses its current connection because of movement, rotation and/or blocking, a BPL and a duplexing configuration may be determined based on predetermined interference criteria for such a UE;

2. When a new UE device arrives in the cell or an idle UE device becomes active in the cell or a UE device loses its current connection because of movement, rotation and/or blocking, BPL and duplexing configurations may be determined based on predetermined interference criteria for such a UE device, and for other UE devices in the cell associated with the same TRP;

3. When a new UE device arrives in the cell or an idle UE device becomes active in the cell or a UE device loses its current connection because of movement, rotation and/or blocking, BPL and duplexing configurations may be determined based on predetermined interference criteria for such a UE device, respectively, and for other UE devices associated with other TRPs, for example coordinating TRPs and/or TRPs in other cells, for example adjacent, neighbouring and/or proximal cells.

The first TRP and the second TRP may respectively provide adjacent cells.

The determining the transmission path may comprise determining a time division duplex (TDD) configuration for the first UE device and/or the second UE device, as described previously.

The determining may be based at least in part on CLI from transmission between the first TRP and another UE device associated with the first TRP. The determining may be based at least in part on CLI due to transmission between the first TRP and the first UE device.

The determining may be responsive to the first UE device entering a first cell, for example from another cell due to movement of the first UE device from the another cell to the first cell. The first cell may be defined by the first TRP.

The determining may be responsive to the first UE device changing state from an idle state to an active state in a first cell.

In one example, the determining is responsive to the first UE device losing connection, for example current connection, with the first TRP because of movement, rotation and/or blocking of the first UE device.

The CLI measurement and/or reporting may be based, at least in part, on Reference Signal Received Power (RSRP) and/or Received Signal Strength Indicator (RSSI). In one example, BPL selection is based, at least in part, on RSRP and/or channel state information (CSI).

The determining the BPL between the first TRP and the first UE device and the transmission path therebetween may comprise sequentially and/or successively determining the BPL between the first TRP and the first UE device and determining the transmission path therebetween. The determining the BPL between the first TRP and the first UE device and the transmission path therebetween may comprise simultaneously determining the BPL between the first TRP and the first UE device and determining the transmission path therebetween. The determining the BPL between the first TRP and the first UE device and the transmission path therebetween may comprise iteratively determining the BPL between the first TRP and the first UE device and determining the transmission path therebetween. The determining the BPL between the first TRP and the first UE device and the transmission path therebetween may comprise sequentially-iteratively and/or successively-iteratively determining the BPL between the first TRP and the first UE device and determining the transmission path therebetween.

The method may comprise measuring, for example by the second UE device, interference, for example CLI generated by the first UE device. The method may comprise reporting or forwarding, for example by the second UE device, results or measurements of the measuring of the interference, for example to the TRP, as described previously.

The method may comprise muting a resource and/or a plurality of resources, as described previously The method may comprise signalling to mute a resource and/or a plurality of resources, for example a certain SRS resource and/or a certain PRACH resource, is based on MAC Control Element (MAC CE) signalling.

The resources, for example SRS resources and/or PRACH resources, indicated to be muted may be assumed by the first UE device to remain muted until reception of a subsequent signal.

The MAC CE signalling may be configurable, for example optionally configured. If the signalling is not configured, the first UE device may assume that some and/or all resources configured by RRC are not muted.

The signalling to mute a resource and/or a plurality of resources, for example a certain SRS resource and/or a certain PRACH resource, may be based on dynamic control information (DCI) signalling, carried on a physical downlink control channel (PDCCH).

The method may comprise controlling the first UE device and/or the second UE device to control UL transmission power, for example by reducing the UL transmission power and/or limiting the UL transmission power to a predetermined or a dynamic limit.

FIGS. 5A and 5B schematically depict other methods according to exemplary embodiments, in more detail.

FIG. 5A schematically depicts a method of controlling communication in a network comprising a first transmission/reception point (TRP) associated with a first user equipment (UE) device and a second TRP associated with a second UE device according to an exemplary embodiment, comprising sequentially and/or successively determining the BPL between the first TRP and the first UE device and determining the transmission path therebetween. Specifically, determining the BPL between the first TRP and the first UE device and the transmission path therebetween comprises sequentially-iteratively and/or successively-iteratively determining the BPL between the first TRP and the first UE device and determining the transmission path therebetween.

At S51A, the BPL between the first TRP and the first UE device is determined.

At S52A, following determination of the BPL, the transmission path between the first TRP and the first UE device is determined.

In addition, following determination of the transmission path, the steps S51A and S52A may be repeated iteratively.

The method may include any of the steps described previously.

In other words, the method, as schematically depicted in FIG. 5A, is implemented as a sequential-iterative method. The sequential-iterative method may, for example, perform in the first place the beam management-related decisions, and only afterwards would duplexing configuration be decided, choosing to alternate the TDD configuration of neighbouring cells in case beamformed interference is degrading. This decision may be modified over time in a iterative manner, as TDD decisions are fed back to the beam management to redetermine the beams.

FIG. 5B schematically depicts a method of controlling communication in a network comprising a first transmission/reception point (TRP) associated with a first user equipment (UE) device and a second TRP associated with a second UE device according to an exemplary embodiment, comprising simultaneously determining the BPL between the first TRP and the first UE device and determining the transmission path therebetween.

At S51B, the BPL between the first TRP and the first UE device is determined.

At S52B, simultaneously with determination of the BPL, the transmission path between the first TRP and the first UE device is determined.

The method may include any of the steps described previously.

In other words, the method, as schematically depicted in FIG. 5B, is implemented as a simultaneous method. In contrast to the sequential-iterative method, for the simultaneous method, the method simultaneously outputs a beam alignment decision and a duplexing configuration for the first TRP and the first UE device. It should be noted that the TDD configuration may not be UE-specific and therefore may not always feasible for each individual UE device. However, the CLI interference pattern of each UE device will be accumulated and contribute to the final TDD configuration decision.

FIGS. 6 and 7 schematically depict other methods according to exemplary embodiments.

Particularly, FIG. 6 schematically depicts a method of UL beam management without RRC configuration. A method of DL management without RRC configuration is similar.

At S61, all SRS/PRACH resources from RRC configured pool are loaded.

At S62, if signal of 'harmful' beams is detected, the method continues to S63. Otherwise, the method continues to S64.

At S63, the signalled "harmful" beams are removed from the pool and corresponding SRS/PRACH resources released.

At S64, beam sweeping using the beams in the pool is conducted.

FIG. 7 schematically depicts yet another method according to an exemplary embodiment.

Particularly, FIG. 7 schematically depicts a method of UL beam management with RRC configuration. A method of DL management with RRC configuration is similar.

At S71, all SRS/PRACH resources from RRC configured pool are loaded.

At S72, if RRC reconfiguration is received, the method continues to S73. Otherwise, the method continues to S74.

At S73, the signalled "harmful" beams are removed from the pool and corresponding SRS/PRACH resources released.

At S74, beam sweeping using the beams in the pool is conducted.

Referring again to FIGS. 6 and 7, UL beam management is taken as an example but the same method can be applied to DL beam management as a size of the candidate beam set could be reduced since the UE device already knows that some of the beams that will cause significant interference. From the UE-to-UE interference measurement reports obtained from previous CLI management operation, the 'harmful' SRS transmission beams causing major interference from the aggressor UE device can be identified. When the aggressor UE device conducts beam sweep in UL BM, it can explore the existing measurement reports obtained from UE-to-UE measurement and identify the 'harmful' SRS transmission beams. Therefore, the NW can configure the candidate SRS transmission beam set and eliminate those harmful SRS transmission beams that will cause significant cross link interference from the set so that the size of the candidate SRS transmission beam set can be reduced. Therefore such information can be used to facilitate BM procedure so that there is reduced need to configure SRS and reporting when conducting BM for the UE device. In this regard, there is a need to inform the UE device about the harmful transmission directions so that these transmission directions can be muted for certain SRS resources, which have already been configured by RRC. It can also be done in semi-persistent way that that a RRC reconfiguration signal can be sent to remove certain transmission direction(s) and thus also resulting in reduced SRS resources. Either approach chosen (i.e. without RRC re-configuration or with RRC reconfiguration), there needs to be a way to tell the UE device that a SRS transmission beam(s) is not needed.

Referring again to FIGS. 6 and 7, it should be noted that the beam might not be removed from the resource pool but rather deactivated and such deactivation can be controlled by a timer configured by RRC or new RRC, MAC CE or DCI signalling. In summary, the invention provides a method of controlling communication in a network. Also provided is a transmission/reception point (TRP), a user equipment (UE) device, a system comprising a TRP and a UE device, and a computer-readable storage medium. By jointly determining the BPL between a first TRP and a first UE device and transmission path, for example downlink (DL) or uplink (UL), therebetween, based at least in part on the CLI with the transmission between a second TRP and a second UE device, interference may be reduced, interference management may be facilitated, beam management signalling overhead may be reduced, and/or beam management may be accelerated. In this way, increased data transmission rates for an increased number of TRPs and/or UE devices may be provided while maintaining and/or improving QoS.

The programs running on the device according to the present disclosure may be programs that enable the computer to implement functions of the embodiments of the present disclosure by controlling a central processing unit (CPU). The programs or information processed by the programs may be temporarily stored in a volatile memory, such as a random access memory (RAM), a hard disk drive (HDD), a non-volatile memory (e.g., flash memory), or other memory system.

The programs for realizing the functions of the embodiments of the present disclosure may be recorded on a computer-readable recording medium. Corresponding functions can be realized by making the computer system read the programs recorded on the recording medium and execute these programs. The so-called "computer system" herein may be a computer system embedded in the device, and may include an operating system or hardware, such as a peripheral device. The "computer-readable recording medium" may be a semi-conductor recording medium, an optical recording medium, a magnetic recording medium, a recording medium for a short-time dynamic storage program, or any other computer readable recording medium.

Various features or functional blocks of the device used in the above embodiments may be implemented or executed by circuitry (e.g., monolithic or multi-chip integrated circuits). The circuitry designed to perform the functions described in this specification may include general purpose processors, digital signal processors (DSPs), application specific integrated circuits (ASICs), field programmable gate arrays (FPGAs), or other programmable logic devices, discrete gate or transistor logic, discrete hardware components, or any combination of the above devices. The general purpose processor may be a microprocessor or any existing processor, controller, microcontroller, or state machine. The circuit may be a digital circuit or an analog circuit. One or more embodiments of the present disclosure may also be implemented using these new integrated circuit techniques in the event of a new integrated circuit technology that replaces existing integrated circuits due to advances in semiconductor technology. Accordingly, the above-described embodiments of the present disclosure can be implemented in a general-purpose digital computer that operates the program using a computer-readable recording medium and a computer-executable program.

The computer-readable recording medium can include a storage medium such as a magnetic storage medium (e.g., ROM, floppy disk, hard disk, etc.), optical reading medium (e.g., CD-ROM, DVD, etc.)

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A first transmission/reception point (TRP) arranged to communicate with a first user equipment (UE) in a wireless communication system, the first TRP comprising:
    a memory;
    a transceiver; and
    a processor configured to:
        based on cross-link interference (CLI) from transmission between a second TRP and a second UE, sequentially determine a beam pair link (BPL) between the first TRP and the first UE, and
        determine a transmission path between the first TRP and the first UE.

2. The first TRP of claim 1, wherein the first TRP and the second TRP provide respective adjacent cells.

3. The first TRP of claim 1, wherein the processor is further configured to determine a time division duplex (TDD) configuration for at least one of the first UE or the second UE.

4. The first TRP of claim 1, wherein the determination-is of the BPL between the first TRP and the first UE and the determination of the transmission path between the first TRP and the first UE are based on the CLI due to transmission between the first TRP and the first UE.

5. The first TRP of claim 1, wherein the determination is of the BPL between the first TRP and the first UE and the determination of the transmission path between the first TRP and the first UE are responsive to the first UE entering a cell.

6. The first TRP of claim 1, wherein the processor is further configured to measure the CLI.

7. The first TRP of claim 1, wherein the processor is further configured to mute a sounding reference signal (SRS) resource or a physical random access channel (PRACH) resource for uplink (UL) and synchronization signal (SS) resource or beam management channel state information-reference signal (CSI-RS) resource for downlink (DL).

8. The first TRP of claim 1, wherein the processor is further configured to control at least one of the first UE or the second UE to control uplink (UL) transmission power of a reference signal.

9. The first TRP of claim 1, wherein the first UE is among a plurality of UEs, and wherein the processor is further configured to determine the BPL between the first TRP and the first UE and the transmission path between the first TRP and the first UE for the plurality of UEs.

10. The first TRP of claim 1, wherein the first UE is among a plurality of UEs and the first TRP is among a plurality of TRPs, and wherein the processor is further configured to determine the BPL between the first TRP and the first UE among the plurality of UEs and the transmission path between the first TRP and the first UE for the plurality of UEs or the plurality of TRPs.

11. The first TRP of claim 1, the processor is further configured to establish a correspondence between a CLI measurement reference signal and a beam management reference signal of the first UE.

12. A first user equipment (UE) arranged to communicate with a first transmission/reception point (TRP) in a wireless communication system, the first UE comprising:
a memory;
a transceiver; and
a processor configured to:
based on cross-link interference (CLI) from transmission between a second TRP and a second UE, sequentially determine a beam pair link (BPL) between the first TRP and the first UE, and
determine a transmission path between the first TRP and the first UE.

13. The first UE of claim 12, wherein the first TRP and the second TRP provide respective adjacent cells.

14. The first UE of claim 12, wherein the processor is further configured to determine a time division duplex (TDD) configuration for at least one of the first UE or the second UE.

15. The first UE of claim 12, wherein the processor is further configured to mute a sounding reference signal (SRS) resource or a physical random access channel (PRACH) resource for uplink (UL) and synchronization signal (SS) resource or beam management channel state information-reference signal (CSI-RS) resource for downlink (DL).

16. The first UE of claim 12, wherein the processor is further configured to control at least one of the first UE or the second UE to control uplink (UL) transmission power of a reference signal.

17. The first UE of claim 12, wherein the first UE is among a plurality of UEs, and wherein the processor is further configured to determine the BPL between the first TRP and the first UE and the transmission path between the first TRP and the first UE for the plurality of UEs.

18. A method of operating a first transmission/reception point (TRP) arranged to communicate with a first user equipment (UE) in a wireless communication system, the method comprising:
based on cross-link interference (CLI) from transmission between a second TRP and a second UE, sequentially determining a beam pair link (BPL) between the first TRP and the first UE, and determining a transmission path between the first TRP and the first UE.

* * * * *